(12) United States Patent
Shiragami

(10) Patent No.: US 12,338,170 B2
(45) Date of Patent: Jun. 24, 2025

(54) GLASS POWDER AND SEALING MATERIAL USING SAME

(71) Applicant: NIPPON ELECTRIC GLASS CO., LTD., Otsu (JP)

(72) Inventor: Toru Shiragami, Otsu (JP)

(73) Assignee: NIPPON ELECTRIC GLASS CO., LTD., Otsu (JP)

(\*) Notice: Subject to any disclaimer, the term of this patent is extended or adjusted under 35 U.S.C. 154(b) by 885 days.

(21) Appl. No.: 17/425,067

(22) PCT Filed: Dec. 19, 2019

(86) PCT No.: PCT/JP2019/049760
§ 371 (c)(1),
(2) Date: Jul. 22, 2021

(87) PCT Pub. No.: WO2020/153061
PCT Pub. Date: Jul. 30, 2020

(65) Prior Publication Data
US 2022/0098089 A1 Mar. 31, 2022

(30) Foreign Application Priority Data
Jan. 25, 2019 (JP) .................. 2019-010939

(51) Int. Cl.
| C03C 8/24 | (2006.01) |
| C03C 3/16 | (2006.01) |
| C03C 3/21 | (2006.01) |
| C03C 8/08 | (2006.01) |

(52) U.S. Cl.
CPC ............... *C03C 8/24* (2013.01); *C03C 3/16* (2013.01); *C03C 3/21* (2013.01); *C03C 8/08* (2013.01); *C03C 2205/00* (2013.01)

(58) Field of Classification Search
CPC ............. C03C 3/21; C03C 3/122; C03C 8/24
See application file for complete search history.

(56) References Cited

U.S. PATENT DOCUMENTS

| 2010/0180934 A1* | 7/2010 | Naito ................. C03C 8/24 |
| | | 252/514 |
| 2011/0095240 A1 | 4/2011 | Nakamura et al. |
| 2013/0333748 A1 | 12/2013 | Naito et al. |
| 2014/0004649 A1 | 1/2014 | Nakamura et al. |

(Continued)

FOREIGN PATENT DOCUMENTS

| CN | 101781090 A | 7/2010 |
| CN | 102081986 A | 6/2011 |
| CN | 103648999 A | 3/2014 |

(Continued)

OTHER PUBLICATIONS

International Search Report mailed Feb. 4, 2020 for PCT/JP2019/049760 with English language translation.

(Continued)

*Primary Examiner* — Matthew E. Hoban
(74) *Attorney, Agent, or Firm* — Faegre Drinker Biddle & Reath LLP

(57) ABSTRACT

A glass powder contains, as a glass composition, $TeO_2$ of 15 mol % to 65 mol %, $MoO_3$ of 10 mol % to 60 mol %, and $P_2O_5$ of 1 mol % to 35 mol %, and is substantially free of PbO.

20 Claims, 1 Drawing Sheet

(56) References Cited

U.S. PATENT DOCUMENTS

2014/0145122 A1* 5/2014 Sawai ..................... C03C 8/14
                                                          501/15
2017/0352773 A1   12/2017 Nakamura et al.

FOREIGN PATENT DOCUMENTS

| | | |
|---|---|---|
| CN | 104150777 A | 11/2014 |
| CN | 107586039 A | 1/2018 |
| CN | 112055699 A | 12/2020 |
| JP | S63-315536 A | 12/1988 |
| JP | 2006-137635 A | 6/2006 |
| JP | 2010-184852 A | 8/2010 |
| JP | 2013-139343 A | 7/2013 |
| JP | 2018-123016 A | 8/2018 |

OTHER PUBLICATIONS

Written Opinion mailed Feb. 4, 2020 for PCT/JP2019/049760 with partial English language translation.
First Chinese Office Action issued Nov. 17, 2022 in Chinese Patent Application No. 201980076217.1 with English-language translation.
Second Chinese Office Action issued Jun. 30, 2023 in Application No. 201980076217.1.
Notice of Reasons for Refusal issued Jul. 13, 2022 in Japanese Patent Application No. 2019-010939 (2 pages) with an English translation (2 pages).

* cited by examiner

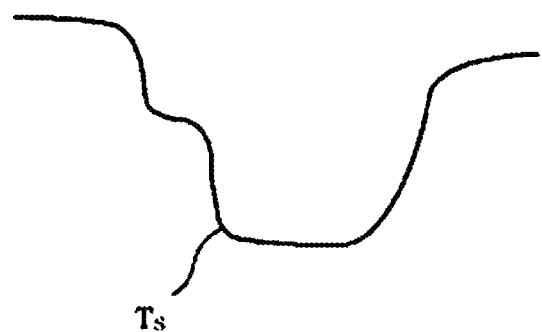

GLASS POWDER AND SEALING MATERIAL USING SAME

TECHNICAL FIELD

The present invention relates to a glass powder that enables airtight sealing at a low temperature of 500° C. or lower and that is free of harmful lead, and a sealing material using the same.

BACKGROUND ART

A sealing material is used for a dye-sensitized solar cell panel, a dimming mirror panel using electrochromic technology, or the like.

Since the above sealing material is required to have chemical durability and heat resistance, a glass-based sealing material is used instead of a resin-based adhesive. The glass-based sealing material is required to have properties such as mechanical strength, fluidity, and weather resistance, and the sealing temperature for sealing an electronic component equipped with a heat-sensitive element is required to be as low as possible. Specifically, sealing at 500° C. or lower is required. Therefore, as a glass satisfying the above properties, a lead borate-based glass containing a large amount of PbO, which has an extremely large effect of lowering the melting point, has been widely used (see, for example, Patent Literature 1).

CITATION LIST

Patent Literature

Patent Literature 1: JP-A-S63-315536

SUMMARY OF INVENTION

Technical Problem

In recent years, environmental problems have been pointed out regarding PbO contained in the lead borate-based glass, and it is desired to replace the lead borate-based glass with a glass free of PbO.

In view of the above circumstances, an object of the present invention is to provide a glass powder that enables sealing at a low temperature and that is free of lead harmful to environment, and a sealing material using the same.

Solution to Problem

A glass powder according to the present invention contains, as a glass composition, $TeO_2$ of 15 mol % to 65 mol %, $MoO_3$ of 10 mol % to 60 mol %, and $P_2O_5$ of 1 mol % to 35 mol %, and is substantially free of PbO. The expression "substantially free of PbO" refers to the case where the content of PbO in the glass composition is 1,000 ppm or less (mass).

When the glass powder according to the present invention contains 15 mol % or more of $TeO_2$ and 10 mol % or more of $MoO_3$, a low softening point is achieved. In general, when the melting point of the glass is lowered, since the glass is devitrified without vitrification or subjected to phase separation, it tends to be difficult to obtain a homogeneous glass. However, in the present invention, the contents of $TeO_2$ and $MoO_3$ are regulated as described above, and the content of $P_2O_5$ is regulated to be 1 mol % or more, so that the glass is stabilized and a homogeneous glass can be obtained.

It is preferable that the glass powder according to the present invention further contains $WO_3$ of 0 mol % to 25 mol %, CuO of 0 mol % to 30 mol %, $Bi_2O_3$ of 0 mol % to 35 mol %, and $Ag_2O$ of 0 mol % to 25 mol %.

It is preferable that the glass powder according to the present invention further contains $Na_2O$ of 0 mol % to 20 mol % and $K_2O$ of 0 mol % to 15 mol %.

A sealing material according to the present invention contains 40 vol % to 100 vol % of the above glass powder, and 0 vol % to 60 vol % of a refractory filler powder.

It is preferable in the sealing material according to the present invention that the refractory filler powder is one or more selected from a zirconium phosphate-based compound, a cordierite, a willemite, an alumina, a zircon, a zirconia, a tin oxide, a quartz glass, a β-eucryptite, and a spodumene.

A sealing material paste according to the present invention contains the above sealing material and a vehicle.

Advantageous Effects of Invention

It is possible to provide a glass powder that enables sealing at a low temperature and that is free of lead harmful to environment, and a sealing material using the same.

BRIEF DESCRIPTION OF DRAWINGS

FIG. 1 is a schematic diagram showing a measurement curve obtained by a macro-type differential thermal analyzer.

DESCRIPTION OF EMBODIMENTS

A glass powder according to the present invention contains, as a glass composition, $TeO_2$ of 15 mol % to 65 mol %, $MoO_3$ of 10 mol % to 60 mol %, and $P_2O_5$ of 1 mol % to 35 mol %, and is substantially free of PbO. The reasons for limiting the glass composition as described above are shown below. In the following description of the content of each component, "%" means "mol %" unless otherwise specified.

$TeO_2$ is a component that lowers the viscosity (softening point, etc.) of the glass and forms a glass network. In addition, $TeO_2$ is also a component that improves weather resistance. The content of $TeO_2$ is 15% to 65%, preferably 25% to 60%, and particularly preferably 35% to 55%. When the content of $TeO_2$ is too low, the viscosity (softening point, etc.) of the glass is increased, low-temperature sealing is difficult, the glass is thermally unstable, and the glass tends to be devitrified during melting or firing. In addition, the weather resistance tends to decrease. On the other hand, when the content of $TeO_2$ is too high, the glass is thermally unstable, the glass tends to be devitrified during melting or firing, and the thermal expansion coefficient of the glass tends to be too high.

$MoO_3$ is a component that lowers the viscosity (softening point, etc.) of the glass and forms a glass network. In addition, $MoO_3$ is also a component that improves weather resistance. The content of $MoO_3$ is 10% to 60%, preferably 15% to 55%, and particularly preferably 25% to 45%. When the content of $MoO_3$ is too low, the viscosity (softening point, etc.) of the glass is increased, low-temperature sealing is difficult, the glass is thermally unstable, and the glass tends to be devitrified during melting or firing. In addition, the weather resistance tends to decrease. On the other hand, when the content of $MoO_3$ is too high, the glass is thermally unstable, the glass tends to be devitrified during melting or firing, and the thermal expansion coefficient of the glass tends to be too high.

$P_2O_5$ is a component that forms a glass network and thermally stabilizes the glass. The content of $P_2O_5$ is 1% to 35%, preferably 2% to 20%, and particularly preferably 3% to 15%. When the content of $P_2O_5$ is too low, the glass is thermally unstable, and the glass tends to be devitrified during melting or firing. On the other hand, when the content of $P_2O_5$ is too high, the viscosity (softening point, etc.) of the glass is increased, low-temperature sealing is difficult, and the weather resistance tends to decrease.

The glass powder according to the present invention is substantially free of PbO for environmental reasons.

The glass powder according to the present invention may contain the following components in the glass composition, in addition to the above components.

$WO_3$ is a component that lowers the thermal expansion coefficient of the glass. The content of $WO_3$ is 0% to 25%, preferably 0% to 10%, and particularly preferably 0.1% to 7%. When the content of $WO_3$ is too high, the glass is thermally unstable, the glass tends to be devitrified during melting or firing, the viscosity (softening point, etc.) of the glass is increased, and low-temperature sealing is difficult.

CuO is a component that lowers the viscosity (softening point, etc.) of the glass and lowers the thermal expansion coefficient of the glass. The content of CuO is 0% to 30%, preferably 0% to 10%, more preferably 0% to 6%, and particularly preferably 0% to 2%. When the content of CuO is too high, the glass is thermally unstable, and the glass tends to be devitrified during melting or firing.

$Bi_2O_3$ is a component that lowers the viscosity (softening point, etc.) of the glass and lowers the thermal expansion coefficient of the glass. The content of $Bi_2O_3$ is 0% to 35%, preferably 0% to 20%, and particularly preferably 0% to 15%. When the content of $Bi_2O_3$ is too high, the glass is thermally unstable, and the glass tends to be devitrified during melting or firing.

$Ag_2O$ is a component that lowers the viscosity (softening point, etc.) of the glass. The content of $Ag_2O$ is 0% to 25%, preferably 0% to 10%, and particularly preferably 0% to 5%. When the content of $Ag_2O$ is too high, the glass is thermally unstable, and the glass tends to be devitrified during melting or firing.

$Na_2O$ is a component that lowers the viscosity (softening point, etc.) of the glass. The content of $Na_2O$ is 0% to 20%, preferably 0% to 10%, and particularly preferably 0% to 5%. When the content of $Na_2O$ is too high, the glass is thermally unstable, the glass tends to be devitrified during melting or firing, and the weather resistance tends to decrease.

$K_2O$ is a component that lowers the viscosity (softening point, etc.) of the glass. The content of $K_2O$ is 0% to 15%, preferably 0% to 10%, and particularly preferably 0% to 5%. When the content of $K_2O$ is too high, the glass is thermally unstable, the glass tends to be devitrified during melting or firing, and the weather resistance tends to decrease.

MgO, CaO, SrO, and BaO have the effect of thermally stabilizing the glass and improving the weather resistance, and the total content thereof is preferably 0% to 20%, and particularly preferably 0% to 10%. When the total content of MgO, CaO, SrO, and BaO is too high, the glass is thermally unstable, and the glass tends to be devitrified during melting or firing. The contents of MgO, CaO, SrO, and BaO are each preferably 0% to 10%, and particularly preferably 0% to 5%.

ZnO is a component that lowers the viscosity (softening point, etc.) of the glass and improves the weather resistance. The content of ZnO is preferably 0% to 10%, and particularly preferably 0% to 5%. When the content of ZnO is too high, the glass is thermally unstable, and the glass tends to be devitrified during melting or firing.

$Nb_2O_5$ is a component that thermally stabilizes the glass and improves the weather resistance. The content of $Nb_2O_5$ is preferably 0% to 10%, and particularly preferably 0% to 5%. When the content of $Nb_2O_5$ is too high, the viscosity (softening point, etc.) of the glass is increased, and low-temperature sealing tends to be difficult.

$V_2O_5$ is a component that forms a glass network and lowers the viscosity (softening point, etc.) of the glass. The content of $V_2O_5$ is preferably 0% to 10%, and particularly preferably 0% to 5%. When the content of $V_2O_5$ is too high, the glass is thermally unstable, the glass tends to be devitrified during melting or firing, and the weather resistance tends to decrease.

$Ga_2O_3$ is a component that thermally stabilizes the glass and improves the weather resistance. Because of being very expensive, the content of $Ga_2O_3$ is less than 0.01%, and it is preferably that $Ga_2O_3$ is not contained.

$SiO_2$, $Al_2O_3$, $GeO_2$, $Fe_2O_3$, NiO, $CeO_2$, $B_2O_3$, $Sb_2O_3$, and $ZrO_2$ are components that thermally stabilize the glass and prevent devitrification, each of which can be added up to less than 2%. When the content of these components is too high, the glass is thermally unstable, and the glass tends to be devitrified during melting or firing.

The maximum particle size $D_{max}$ of the glass powder is preferably 100 μm or less, and particularly preferably 75 μm or less. When the maximum particle size $D_{max}$ of the glass powder is too large, the time required for sealing is long, and it is difficult to make a gap between objects to be sealed uniform. Here, the term "maximum particle size $D_{max}$" refers to the value measured by a laser diffractometer and represents a particle size in which the integrated amount is 99% cumulative from the smallest particle in a volume-based cumulative particle size distribution curve measured by a laser diffraction method.

A sealing material according to the present invention contains the above glass powder. The sealing material according to the present invention may contain a refractory filler powder in order to improve the mechanical strength or adjust the thermal expansion coefficient. As for the mixing proportion, the glass powder is 40 vol % to 100 vol % and the refractory filler powder is 0 vol % to 60 vol %; it is preferable that the glass powder is 50 vol % to 99 vol % and the refractory filler powder is 1 vol % to 50 vol %; and it is particularly preferable that the glass powder is 60 vol % to 95 vol % and the refractory filler powder is 5 vol % to 40 vol %. When the content of the refractory filler powder is too large, the proportion of the glass powder is relatively small, and it is difficult to ensure the desired fluidity.

The refractory filler powder is not particularly limited, and various materials can be selected. In addition to having a low thermal expansion coefficient, it is preferable that the refractory filler powder has high mechanical strength and does not easily react with the above glass powder.

Specifically, a zirconium phosphate-based compound such as $NbZr(PO_4)_3$, $Zr_2WO_4(PO_4)_2$, cordierite, willemite, alumina, zircon, zirconia, tin oxide, quartz glass, β-eucryptite, β-quartz solid solution, spodumene, and the like can be used alone or in combination of two or more thereof.

The maximum particle size $D_{max}$ of the refractory filler powder is preferably 75 μm or less, and particularly preferably less than 50 μm. When the maximum particle size $D_{max}$ of the refractory filler powder is too large, it is difficult to make a gap between materials to be sealed uniform.

The thermal expansion coefficient of the sealing material according to the present invention is $30\times10^{-7}/°$ C. to $150\times10^{-7}/°$ C., preferably $40\times10^{-7}/°$ C. to $130\times10^{-7}/°$ C., and particularly preferably $50\times10^{-7}/°$ C. to $110\times10^{-7}/°$ C. When the thermal expansion coefficient of the sealing material is too low or too high, due to the difference in the thermal expansion coefficient between the sealing material and a material to be sealed, the sealing material and the material to be sealed tend to be damaged during and after the sealing. Here, the term "thermal expansion coefficient" refers to a value measured by a push rod type thermal expansion coefficient measurement (TMA) device, in which the measurement temperature range is 30° C. to 300° C.

When the difference in the thermal expansion coefficient between the sealing material and the material to be sealed in the present invention is regulated to less than $50\times10^{-7}/°$ C., less than $30\times10^{-7}/°$ C., and particularly $10\times10^{-7}/°$ C. or less, it is easier to prevent damage to the sealing material and the material to be sealed.

The softening point of the sealing material according to the present invention is 500° C. or lower, preferably 450° C. or lower, and particularly preferably 430° C. or lower. When the softening point is too high, the viscosity of the glass is increased, so that the sealing temperature rises, which may deteriorate the element during the sealing. The lower limit of the softening point is not particularly limited, and is practically 180° C. or higher. Here, the term "softening point" refers to a value measured by a macro-type differential thermal analyzer. As the measurement conditions, the measurement is started from room temperature, and the temperature rising rate is 10° C./min. The softening point measured by the macro-type differential thermal analyzer refers to a temperature (Ts) at the fourth bending point in the measurement curve shown in FIG. 1.

Next, an example of a method for producing the glass powder and the sealing material according to the present invention will be described.

First, a raw material powder prepared to have the above composition is melted at 800° C. to 1,000° C. for 1 to 2 hours until a homogeneous glass is obtained. Next, the molten glass is formed into a film shape or the like, then crushed and classified to produce the glass powder according to the present invention. The average particle size $D_{50}$ of the glass powder is preferably about 2 μm to 20 μm. If necessary, various refractory filler powders are added to the glass powder to prepare the sealing material.

The sealing material according to the present invention may be used in a powder state, and it is easy to handle if the sealing material is uniformly kneaded with a vehicle and processed into a sealing material paste. The vehicle mainly contains a solvent and a resin. The resin is added for the purpose of adjusting the viscosity of the sealing material paste. Further, if necessary, a surfactant, a thickener and the like can be added. The sealing material paste is coated onto the material to be sealed using a coating machine such as a dispenser or a screen printing machine, and then subjected to a heat treatment step of drying, debindering, and glaze to be formed as a sealing material layer. The material to be sealed is not particularly limited, and a glass substrate such as a non-alkali glass, an alkaline borosilicate glass, and a soda-lime glass can be used. A functional film may be formed on the surface of the substrate for the purpose of imparting electrical conductivity to the substrate.

As the organic solvent, N,N dimethylformamide (DMF), α-terpineol, higher alcohol, γ-butyl lactone (γ-BL), tetralin, butyl carbitol acetate, ethyl acetate, isoamyl acetate, diethylene glycol monoethyl ether, diethylene glycol monoethyl ether acetate, benzyl alcohol, cycloalkandialkanol, toluene, 3-methoxy-3-methylbutanol, triethylene glycol monomethyl ether, triethylene glycol dimethyl ether, dipropylene glycol monomethyl ether, dipropylene glycol monobutyl ether, tripropylene glycol monomethyl ether, tripropylene glycol monobutyl ether, propylene carbonate, dimethyl sulfoxide (DMSO), N-methyl-2-pyrrolidone, and the like can be used.

As the resin, an acrylic acid ester (acrylic resin), ethyl cellulose, a polyethylene glycol derivative, nitrocellulose, polymethylstyrene, polyethylene carbonate, methacrylic acid ester, and the like can be used. In particular, acrylic ester and nitrocellulose are preferred because of having good thermal decomposability.

The average thickness of the sealing material layer is less than 200 μm preferably less than 150 μm and particularly preferably less than 120 μm. When the average thickness is too large, the stress remaining in the sealing material layer is increased, and the sealing material layer tends to be damaged. The lower limit of the average thickness is not particularly limited, and is practically 1 μm or more.

The maximum width of the sealing material layer is preferably 10,000 μm or less, and particularly preferably 5,000 μm or less. When the maximum width is too large, the stress remaining in the sealing material layer is increased, and the sealing material layer tends to be damaged. The lower limit of the maximum width is not particularly limited, and is practically 1 μm or more.

EXAMPLES

The present invention will be described in detail based on Examples. Table 1 shows Examples (sample Nos. 1 to 7) and Comparative Examples (sample Nos. 8 to 10) of the present invention.

TABLE 1

|  |  | Example | | | | | | | Comparative Example | | |
|---|---|---|---|---|---|---|---|---|---|---|---|
|  |  | No. 1 | No. 2 | No. 3 | No. 4 | No. 5 | No. 6 | No. 7 | No. 8 | No. 9 | No. 10 |
| Glass composition (mol %) | $TeO_2$ | 55.0 | 51.5 | 57.5 | 53.5 | 51.5 | 47.5 | 54.0 | 55.0 | 70.0 | 56.0 |
|  | $MoO_3$ | 35.0 | 30.0 | 27.5 | 33.5 | 32.5 | 27.5 | 36.0 | 40.0 | 15.0 | 7.0 |
|  | $P_2O_5$ | 5.0 | 10.0 | 2.0 | 8.0 | 8.0 | 5.0 | 5.0 |  | 3.0 | 2.0 |
|  | $WO_3$ | 5.0 |  | 8.0 | 5.0 |  |  | 2.0 | 5.0 | 8.0 | 10.0 |
|  | CuO |  | 8.5 |  |  | 3.0 |  |  |  |  | 3.0 |
|  | $Bi_2O_3$ |  |  |  |  | 5.0 | 5.0 |  |  |  | 15.0 |
|  | $Ag_2O$ |  |  |  |  |  | 15.0 |  |  |  |  |
|  | $Na_2O$ |  |  | 5.0 |  |  |  | 1.0 |  | 4.0 |  |
|  | $K_2O$ |  |  |  |  |  |  | 2.0 |  |  |  |
| Refractory filler (vol %) |  | ZWP 40 | ZWP 30 | NZP 45 | Cor 40 | Cor 45 | ZWP 40 | ZWP 45 | Cor 40 | ZWP 45 | Not vitrified |

TABLE 1-continued

| | Example | | | | | | | Comparative Example | | |
|---|---|---|---|---|---|---|---|---|---|---|
| | No. 1 | No. 2 | No. 3 | No. 4 | No. 5 | No. 6 | No. 7 | No. 8 | No. 9 | No. 10 |
| Thermal expansion coefficient ($\times 10^{-7}/°$ C.) | 67 | 72 | 74 | 78 | 72 | 74 | 66 | 74 | 78 | |
| Softening point (° C.) | 435 | 440 | 439 | 455 | 441 | 432 | 431 | 512 | 513 | |
| Fluidity | ○ | ○ | ○ | ○ | ○ | ○ | ○ | × | × | |
| Airtightness | ○ | ○ | ○ | ○ | ○ | ○ | ○ | × | × | |

First, various glass raw materials such as oxides and carbonates were mixed so as to have the glass composition shown in the table, a glass batch was prepared, and then this glass batch was charged into a platinum crucible and was melted at 800° C. to 1,000° C. for 1 to 2 hours. Next, the molten glass was formed into a film shape with a water-cooled roller.

Finally, the film-shaped glass was crushed with a ball mill and then passed through a sieve having a mesh size of 75 μm to obtain a glass powder having a maximum particle size $D_{max}$ of about 75 μm.

Thereafter, as shown in the table, the obtained glass powder and the refractory filler powder were mixed to obtain a mixed powder.

As the refractory filler powder, NbZr(PO$_4$)$_3$ (denoted as NZP in the table), Zr$_2$WO$_4$(PO$_4$)$_2$ (denoted as ZWP in the table), and cordierite (denoted as Cor in the table) were used. The maximum particle size $D_{max}$ of the refractory filler powder was about 75 μm.

The obtained mixed powder was fired at 480° C. for 30 minutes to obtain a fired body. The obtained fired body was used as a TMA sample.

The thermal expansion coefficient, the softening point, the fluidity, and the airtightness were evaluated for sample Nos. 1 to 10.

The thermal expansion coefficient (30° C. to 300° C.) was measured by measuring the TMA sample with a TMA device.

The softening point was measured with a macro-type differential thermal analyzer. The measurement atmosphere was in the atmosphere, the temperature rising rate was 10° C./min, and the measurement was started from room temperature.

The fluidity was evaluated as follows. A powder having a mass corresponding to the synthetic density of each sample was charged into a mold having a diameter of 20 mm and press-molded to obtain a molded body. The obtained molded body was placed on a borosilicate glass substrate, heated in air at a rate of 10° C./min, kept at 480° C. for 10 minutes, and then lowered to room temperature at 10° C./min. Those having a fired body having a flow diameter of 18 mm or more were evaluated as "○", and those having a fired body having a flow diameter of less than 18 mm were evaluated as "×". The synthetic density refers to a theoretical density calculated from the density of the glass powder, the density of the refractory filler powder, and the volume ratio in the table.

The airtightness was evaluated as follows. First, each sample and vehicle (propylene glycol containing a polypropylene glycol resin) were uniformly kneaded with a three-roll mill to form a paste. Next, the paste was coated in a frame shape (thickness: 100 μm, width: 1,000 μm) on a glass substrate (BDA manufactured by Nippon Electric Glass Co., Ltd., 40 mm×0.5 mm thickness, thermal expansion coefficient: 66×10$^{-7}$/° C.). The paste-coated glass substrate was dried in a drying oven at 100° C. for 10 minutes, heated from room temperature at 10° C./min, fired at 480° C. for 10 minutes, and cooled to room temperature at 10° C./min, to form a sealing material layer on the glass substrate. Thereafter, another glass substrate (40 mm×0.5 mm thickness) on which the sealing material layer was not formed was laminated on the glass substrate on which the sealing material layer was formed. Then, a 100 g weight was placed on the laminate, the temperature was raised from room temperature at 10° C./min, firing was performed at 480° C. for 10 minutes, and then the temperature was lowered to room temperature at 10° C./min to obtain a sealing structure. The obtained sealing structure was kept in a constant temperature and humidity chamber maintained at 121° C., 100% humidity and 2 atm for 24 hours. Those with no cracks or peeling in the sealing material layer or glass substrate were evaluated as "○", and those with cracks or peeling in the sealing material layer or glass substrate were evaluated as "×".

As is clear from the table, the sample Nos. 1 to 7, as Examples of the present invention, were excellent in fluidity and airtightness. On the other hand, the sample Nos. 8 and 9, as Comparative Examples, were poor in fluidity due to devitrification during the firing, and the sealing material layer was peeled off in the airtightness evaluation. The sample No. 10 was not vitrified.

INDUSTRIAL APPLICABILITY

The glass powder and the sealing material using the same according to the present invention are suitable for sealing a dye-sensitized solar cell panel, a dimming mirror panel using electrochromic technology, or the like.

The invention claimed is:

1. A glass powder comprising: as a glass composition, TeO$_2$ of 15 mol % to 65 mol %, MoO$_3$ of 10 mol % to 60 mol %, P$_2$O$_5$ of 1 mol % to 35 mol %, Ag$_2$O of 0 mol % to 15 mol %, and V$_2$O$_5$ of 0 mol % to 5 mol %, and substantially free of PbO.

2. The glass powder according to claim 1, further comprising: as the glass composition, WO$_3$ of 0 mol % to 25 mol %, CuO of 0 mol % to 30 mol %, and Bi$_2$O$_3$ of 0 mol % to 35 mol %.

3. The glass powder according to claim 1, further comprising: as the glass composition, Na$_2$O of 0 mol % to 20 mol %, and K$_2$O of 0 mol % to 15 mol %.

4. The glass powder according to claim 2, further comprising: as the glass composition, Na$_2$O of 0 mol % to 20 mol %, and K$_2$O of 0 mol % to 15 mol %.

5. A sealing material comprising: 40 vol % to 100 vol % of the glass powder according to claim 1; and 0 vol % to 60 vol % of a fire resistant filler powder.

6. A sealing material comprising: 40 vol % to 100 vol % of the glass powder according to claim 2; and 0 vol % to 60 vol % of a fire resistant filler powder.

7. A sealing material comprising: 40 vol % to 100 vol % of the glass powder according to claim 3; and 0 vol % to 60 vol % of a fire resistant filler powder.

8. A sealing material comprising: 40 vol % to 100 vol % of the glass powder according to claim 4; and 0 vol % to 60 vol % of a fire resistant filler powder.

9. The sealing material according to claim 5, wherein the fire resistant filler powder is one or more selected from a zirconium phosphate-based compound, a cordierite, a willemite, an alumina, a zircon, a zirconia, a tin oxide, a quartz glass, a β-eucryptite, and a spodumene.

10. The sealing material according to claim 6, wherein the fire resistant filler powder is one or more selected from a zirconium phosphate-based compound, a cordierite, a willemite, an alumina, a zircon, a zirconia, a tin oxide, a quartz glass, a β-eucryptite, and a spodumene.

11. The sealing material according to claim 7, wherein the fire resistant filler powder is one or more selected from a zirconium phosphate-based compound, a cordierite, a willemite, an alumina, a zircon, a zirconia, a tin oxide, a quartz glass, a β-eucryptite, and a spodumene.

12. The sealing material according to claim 8, wherein the fire resistant filler powder is one or more selected from a zirconium phosphate-based compound, a cordierite, a willemite, an alumina, a zircon, a zirconia, a tin oxide, a quartz glass, a β-eucryptite, and a spodumene.

13. A sealing material paste comprising: the sealing material according to claim 5; and a vehicle.

14. A sealing material paste comprising: the sealing material according to claim 6; and a vehicle.

15. A sealing material paste comprising: the sealing material according to claim 7; and a vehicle.

16. A sealing material paste comprising: the sealing material according to claim 8; and a vehicle.

17. A sealing material paste comprising: the sealing material according to claim 9; and a vehicle.

18. A sealing material paste comprising: the sealing material according to claim 10; and a vehicle.

19. A sealing material paste comprising: the sealing material according to claim 11; and a vehicle.

20. A sealing material paste comprising: the sealing material according to claim 12; and a vehicle.

* * * * *